(12) United States Patent
Philbrick et al.

(10) Patent No.: US 11,748,496 B1
(45) Date of Patent: Sep. 5, 2023

(54) DATA JURISDICTION MANAGEMENT (71) Applicant: United Services Automobile Association (USAA), San Antonio, TX (US)

(72) Inventors: Ashley Philbrick, San Antonio, TX (US); Justin Jackson, San Antonio, TX (US); Sean C. Mitchem, San Antonio, TX (US); Yevgeniy Khmelev, San Antonio, TX (US); Ruthie Lyle, Durham, NC (US); Ravi Durairaj, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 364 days.

(21) Appl. No.: 16/942,216

(22) Filed: Jul. 29, 2020

Related U.S. Application Data (60) Provisional application No. 62/880,570, filed on Jul. 30, 2019.

(51) Int. Cl.
| | | |
|---|---|---|
| G06F 21/60 | (2013.01) | |
| G06Q 50/18 | (2012.01) | |
| G06F 21/62 | (2013.01) | |
| H04L 67/52 | (2022.01) | |

(52) U.S. Cl.
CPC ............ *G06F 21/604* (2013.01); *G06F 21/62* (2013.01); *G06Q 50/18* (2013.01); *H04L 67/52* (2022.05)

(58) Field of Classification Search
CPC ....... G06F 21/604; G06F 21/62; G06Q 50/18; H04L 67/52
See application file for complete search history.

(56) References Cited

U.S. PATENT DOCUMENTS

| | | | |
|---|---|---|---|
| 9,430,909 B2 * | 8/2016 | Shore | G07F 17/3218 |
| 2016/0156671 A1 * | 6/2016 | Cabrera | H04L 63/20 726/1 |
| 2019/0138635 A1 * | 5/2019 | Givon | G06F 16/24568 |
| 2020/0067939 A1 * | 2/2020 | Arana | H04W 12/08 |
| 2020/0210990 A1 * | 7/2020 | Laracey | G06Q 20/4015 |

\* cited by examiner

*Primary Examiner* — Mohammad W Reza
(74) *Attorney, Agent, or Firm* — BakerHostetler (57) ABSTRACT

A method for managing data in view of data controls includes determining that a jurisdictional restriction associated with a jurisdiction applies to utilization of a portion of data, determining that a compliant service to utilize the portion of data is unavailable, deploying an instance of the compliant service, and utilizing the portion of data using the instance of the compliant service.

18 Claims, 6 Drawing Sheets

DATA JURISDICTION MANAGEMENT

CROSS-REFERENCE TO RELATED APPLICATIONS

This patent application claims priority to and the benefit of Provisional Patent Application No. 62/880,5470, filed Jul. 30, 2019, which is incorporated herein by reference in its entirety.

TECHNICAL FIELD

The field of invention relates to data protection, and more particularly concerns handling and management of data subject to controls or restrictions.

BACKGROUND

National and state laws increasingly restrict the use of data. Some such laws require particular location of data at rest or only allow certain utilizations of sensitive information in certain locations. However, customers and service providers alike expect access to and utilization of data. Accordingly, techniques to deploy services to jurisdictions, providing services and utilizing data remotely to accord with laws and regulations, would benefit parties in many instances.

SUMMARY

The needs existing in the field are addressed by the present disclosure, which relates to systems, methods, and computer usable media for providing information or services within the constraints of various jurisdictional data controls.

In one general aspect, a system or method herein can be configured to determine that a jurisdictional restriction associated with a jurisdiction applies to utilization of a portion of data, determine that a compliant service to utilize the portion of data is unavailable, deploy an instance of the compliant service, and utilize the portion of data using the instance of the compliant service.

This summary is intended to provide a short description of some aspects only. Additional and alternative details will be apparent on review of other portions of this disclosure.

DETAILED DESCRIPTION OF ILLUSTRATIVE EMBODIMENTS

The landscape of law, regulation, policy (public and private), and best practices for storing and sharing data ("data controls") continues to evolve as technology and the threat landscape associated therewith evolve. While the European Union's General Data Protection Regulation (GDPR) is the most visible example of such, U.S. states such as California, and industries such as healthcare have increasingly stringent and detailed mechanisms for where data can reside and how it can be accessed and shared. These regulations can in some ways inhibit the expectations of highly-networked societies that expect on-demand access to services and information that may leverage such data.

Solutions disclosed herein can balance these interests where data controls involve obligations to store or use data on computers in particular geographic areas or logical locations. Services can be deployed to resources within the obligated location and action can be performed using restricted data based on remote requests without violating data controls. Responses returned to the remote requester can be inspected, modified, sanitized, et cetera, according to rules to avoid exporting or utilizing restricted data in a manner contrary to the data controls. Requesters and involved services can be interrogated to determine the manner in which a request can be met while abiding data controls.

Figure 1:
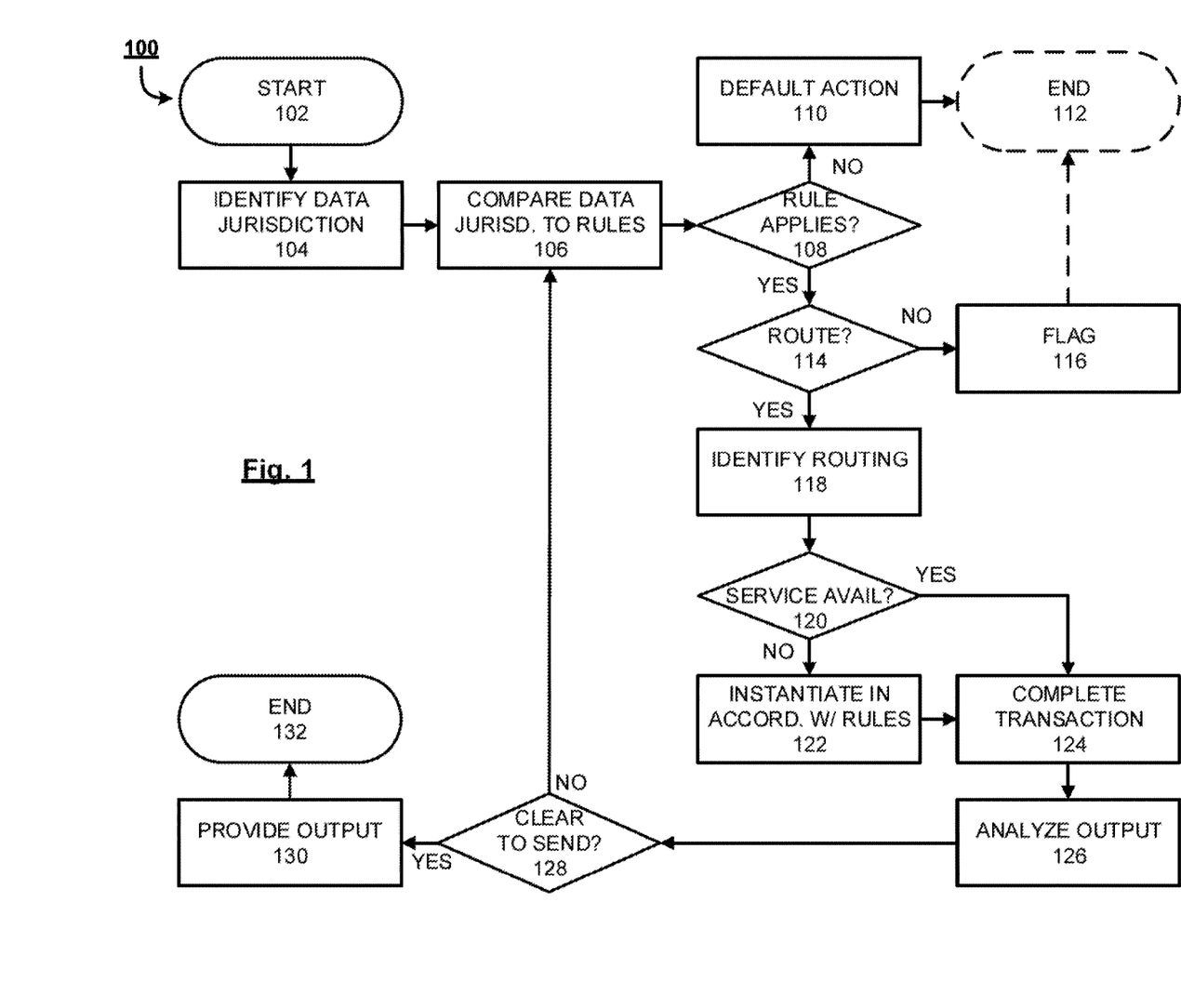
FIG. 1 is a flow chart of an example methodology for managing data according to varying jurisdictional requirements.

FIG. 1 illustrates a flow chart of an example methodology 100 for managing data to abide data controls related to particular geographic or logical locations. Methodology 100 starts at 102 and proceeds to 104 where a data jurisdiction (associated with, e.g., a portion of data, an entity to which the data refers, or a party attempting to access the data) is identified. The data jurisdiction can be based on where data is at rest or stored. In embodiments, the data jurisdiction can be based on where it is at rest and where it is being requested or may be utilized. In all cases, different regulations may apply to data based on where it is at rest, where it is requested, where it transmits to or through, and where it might be later stored.

In embodiments, identification at 104 is in response for a request to use the data. For example, a request for a service or information can be leveraged and a determination can be made that particular data involved is subject to a data control based on the data's content, metadata, data control inspection rules, et cetera. In embodiments, various information or metadata can be associated with a request and the data being requested. Such information or metadata can include, e.g., requester information (describing or identifying the party, service, system, program, et cetera, that is requesting the data), subject information (describing or identifying the party, service, system, program, et cetera, to which the requested data pertains, which may be the same or different than the requester), and requested data information (describing or identifying contents or characteristics of the requested data separately from the requester and subject).

Based on such information, the jurisdiction(s) (e.g., a region such as the Eurozone, a state such as California, an organization, a particular group of secure servers, et cetera) that are associated with, e.g., the requester, subject, data, or other aspects, can be determined and compared to various rules representing various data controls (e.g., laws, regulations, public or private policies (for businesses, governments, agencies, bureaus, administrations, organizations, institutions, et cetera), best practices, other rules). At 108, a determination is made as to whether one or more rules applies to the identified or requested data (or a particular requested use thereof).

If the determination at 108 returns negative—no jurisdictional rule applies for management of involved data—methodology 100 proceeds to 110 where a default action is executed. The default action can be the requested action, or any action not triggering or violative of data controls, e.g., response to a query without further or additional action. Determination of whether a jurisdictional rule applies can be based on the data (e.g., location of physical storage, logical location of storage, type of data), the location and/or type of requester, the location and/or type of an entity to which at least a portion of the data refers (which may or may not be the owner/administrator), and/or other parameters. In embodiments, rules may only apply where a requester is outside a jurisdiction (e.g., based on point of access) or where a requester lacks certain authority or permissions. In embodiments, rules may apply to all data based on the citizenship or residency of a data owner, entity to which the data relates, data user, or data handler (e.g., storing or intermediary entity). In embodiments, a rule can be based on the type of device seeking access, the location of a device seeking access (physical or logical), the network to which a device seeking access to is connected, et cetera. In embodiments, the determination at 108 includes interrogation of a requester or service to determine whether a proxy is involved, and, if a proxy is involved, the determination at 108 can return positive even if the proxy would not trigger the determination.

If the determination at 108 returns positive, an alternative embodiment to that pictured can assess whether the rule/data control includes exceptions that would allow completion of the request. For example, a patient may be permitted to release their own personal healthcare information. In this regard, a release process can be initiated including verifying the user identity and completing requisite releases or approvals to route or use the restricted data. In this manner, if exceptions are available, upon proper completion of an exception process or confirmation, methodology 100 can proceed to 110 and perform the default action after the requisite approvals are complete.

In an embodiment, the determination at 108 can return positive based on an opt-in from a user who requests or volunteers to participate in a higher level of data control than is required by law or policy. In an embodiment, methodology 100 can include a query to a user to determine whether a particular template or schema of rules should be applied.

In an alternative embodiment, a determination at 108 may return positive for more than one reason, or may return conflicting or inconclusive results indicating information relevant to both positive and negative results at 108. In this same embodiment, the determination at 108 may be dependent on user choices or options. Where multiple possible rules may apply and some of those rules are in conflict, a most-restrictive data control rule or rule set can be applied. Further, a custom schema or template providing a most-restrictive set of data control rules can be located or generated and applied to prevent the adoption and enforcement of a rule or rule portion that would not comply with any applicable rule.

If the determination at 108 returns positive (or at least partially positive, as described in relation to the alternative embodiment), methodology 100 proceeds to 114 where a determination is made as to whether data access or a service can be routed in a manner compliant with the relevant data control(s). Routing involves determining each node applicable to the rule—where the data originates, where the data is stored or rests, where the data passes through, where the data is accessed, and/or whether any data or derivative thereof persists after access—complies with the applicable rule(s). Routing can include a means of accessing the relevant data by deploying, e.g., an instance of a service or data accessing agent to the jurisdiction to access the restricted data in a manner that accords with the applicable data control(s). This can include instantiating a virtualized instance of a service, application, or agent on servers in a particular geographic or logical location. In an alternative embodiment where data rules concern only where data is at rest, no service need be leveraged or instantiated, but data storage can be monitored and traced to ensure the data to which rules apply is not placed at rest in an unauthorized location.

If the determination at 114 returns negative, then no means of satisfying the request (e.g., all of the request, a subset of the request) can be performed in a manner compliant with data controls. In such instances, methodology 100 can proceed to 116 where the request is flagged and then methodology 100 ends at 112. In embodiments flagging data can include returning the flag as a warning or notice to the requester, and/or returning the flag to other parties (e.g., information technology, security, others). The flag can be communicated over any protocol or communication channel to appropriate parties as a message, alert, notification, et cetera.

If the determination at 114 returns positive, methodology 100 proceeds to 118 where routing is identified. Identification of routing can include a determination that the data requested can be processed or accessed in a manner responsive to the request using a particular arrangement of accessing devices or services hosted on particular resources or accessed by particular devices. Identification of routing at 118 can include a determination that responsive data can be returned to a requesting party outside a physical or logical jurisdiction in which data controls apply to requested data. Identification of routing at 118 can include a determination as to whether methodology 100 or associated functionality can access resources within a particular jurisdiction (e.g., dedicated or shared computing resources available in a specific geographic or logical location).

If routing is possible, at 120 a determination is made as to whether a service involved in the routing is available. This can include a determination as to whether the service is already available in a place compliant with the data control(s) (e.g., within the jurisdiction, on a secure system, et cetera). If the service or means of accessing the data is not already available (e.g., instantiated and running), the determination at 120 can include, e.g., determining whether the particular service, agent, et cetera, can be deployed to devices or resources within or that are compliant with the jurisdiction or its data controls.

If the determination at 120 returns positive, methodology 100 proceeds to 124 where the transaction is completed. In this manner, no new service is instantiated, and the query or action is completed using existing systems and services in accordance with the applicable rules. This can include accessing controlled or restricted data, accessing a service interacting with controlled or restricted data, et cetera, using a running or preexisting service, interface, application, et cetera. In embodiments, the transaction performed can be a modification of or deviation from the specific request to comply with data controls. For example, methodology 100 can return a subset of requested data after recognizing that the request cannot be literally or completely satisfied based on data controls. In embodiments, no restrictions are involved, and a client can communicate directly with a server (or according to some other architecture) to access and handle data in any manner technically achievable.

However, if the determination at 120 returns negative, a data control compliant service, interface, application, et cetera, can be instantiated to respond to the request. Instantiating a service to abide data controls can include locating resources in a particular physical or logical location, that are associated with proper parties, or that have sufficient capability or permissions to interact with restricted data or respond to the request, then requesting to create an instance for handling the data. Once an instance permitted to perform the requested actions is created, methodology 100 can proceed to 124 to complete the requested transaction.

At 126, an output can be generated based on completion of the transaction. As discussed above, the output may be at rest or carried over systems that are not compliant with data restrictions, and so the output may be different from the precise details of the request inasmuch as the request may be unsatisfiable if it necessarily requires the return of restricted data, but an action can be performed or a modified response can be provided without violating the data controls. In this regard, output generated at 126 can include a subset of requested data, a confirmation message regarding completion of an action, or other acknowledgment that does not involve restricted data. Put another way, the response from the completed transaction can be redacted, edited, modified, or "scrubbed" to ensure that only allowable data, or only that data which is necessary, is returned. Example can include a confirmation of a status or characteristic that does not include the data underlying the confirmation, data that has been anonymized, data that has been excerpted (e.g., a portion of a record but not the whole record), data that has been abstracted, et cetera. A "yes/no" or "go/no-go" confirmation can being provided without including any details regarding the determinative factor for the binary response in some embodiments. Other designers will understand additional techniques for generating such an output on review of the disclosures herewith.

Thereafter, at 128, an assessment of the output can be performed to determine if the output is acceptable to provide based on the applicable data controls. If so, the output can be provided to the requester and/or relevant parties at 130 and methodology 100 can end at 132. However, if the determination at 128 returns negative, methodology 100 can recycle to, e.g., 106, where the process can be repeated to further abstract, redact, or otherwise modify the data using subsequent processing to provide a responsive output without violating any applicable data control. In alternative or complementary embodiments, a negative response at 128 can recycle to another portion, such as the output analysis at 126.

Other variants of methodology 100 can include additional aspects, such as logging and updates to data or rules. Further, steps interrogating the client or requester can be implemented to authenticate and verify the rules applying to a point of access, to include IP address filters, geolocation, MAC address analysis, SIM card tracking, multifactor authentication, et cetera.

Figure 2:
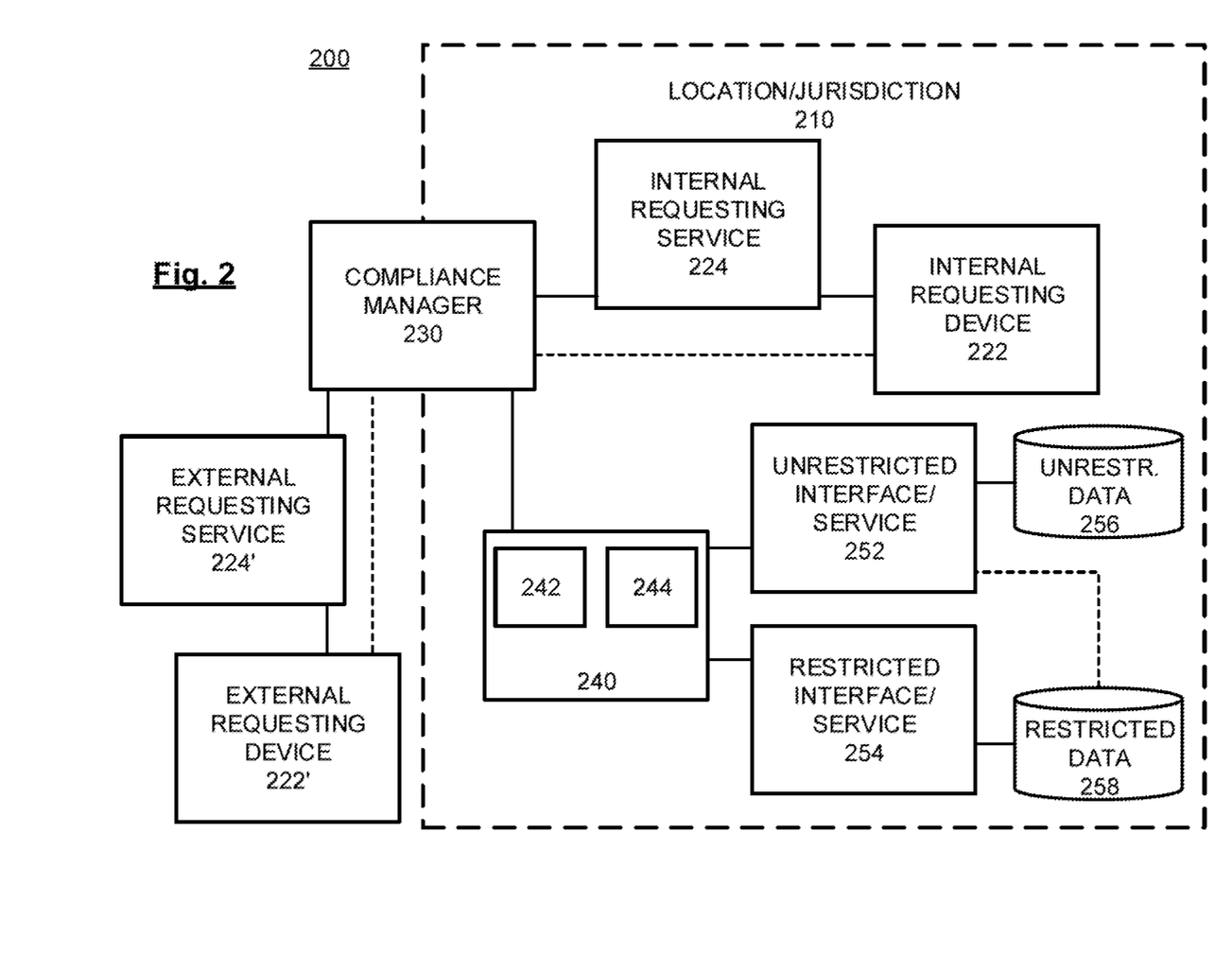
FIG. 2 is a block diagram of an example system for managing data according to varying jurisdictional requirements.

Turning to FIG. 2, a block diagram of an example system 200 for managing data in view of data controls is illustrated. System 200 can include various elements or entities within a physical or logical location or jurisdiction 210, with particular data controls applying to data within location or jurisdiction 210. Various devices or services outside location or jurisdiction 210 (e.g., external requesting device 222', external requesting service 224') within location or jurisdiction 210 (e.g., internal requesting device 222, internal requesting service 224) can request access to data within location or jurisdiction 210 (e.g., unrestricted data 256 and unrestricted data 258), which can be at rest in a variety of locations or subject to a variety of data controls. A compliance manager component 230 can be provided to determine whether data controls apply to particular data requested. While illustrated as a single element, compliance manager component 230 can be implemented within our outside location or jurisdiction 210 in one or more identical or differing instances or services. Various network or cloud resources can be used to provide internal resources 240, which can host, run, instantiate, or otherwise provide services of varying functionality that are compliant with a data control involving location or jurisdiction 210. In embodiments, there may also be interfaces for accessing various sources of data, such as unrestricted interface/service 252 and restricted interface/service 254.

A requesting device such as external requesting device 222' or internal requesting device 222 can request data, directly or through a service/app such as external requesting service 224' or internal requesting service 224. Based on the nature of the request, the data involved can be assessed using compliance manager component 230. Such assessment can occur at the beginning of a request, following routing a request before any data is returned, or repeatedly over the course of a transaction or session to verify ongoing compliance with data controls.

The compliance manager component 230 can determine whether routing is available for satisfying the request by managing or actioning the request using data control compliant services or resources. In embodiments, a preexisting service can be hosted using dedicated or allocated resources 242. If not, compliant services or resources can be instantiated on internal instantiation resources 244, associated with location or jurisdiction 210, to allow handling of the request using local and compliant resources. Thereafter, actions can be taken using appropriate services and routing to complete some or all of the request while observing the applicable data controls. In embodiments, interaction with unrestricted data 256 and/or restricted data 258 can be performed through unrestricted interfaces or services 252 and/or restricted interfaces and/or services 254. In this manner, access can be provided readily to data for which no data control applies, and the risk of merging restricted and unrestricted data can be reduced.

After actions are taken, return or output information can be re-screened by compliance manager component 230 to ensure compliance with data controls before requests are completed. Information in compliance with the jurisdictional rules or data controls can be provided directly by the compliance manager to the client, service, or requester, or the compliance manager can permit the service to deliver the output to the client, service, or requester following the re-screening.

Figure 3:
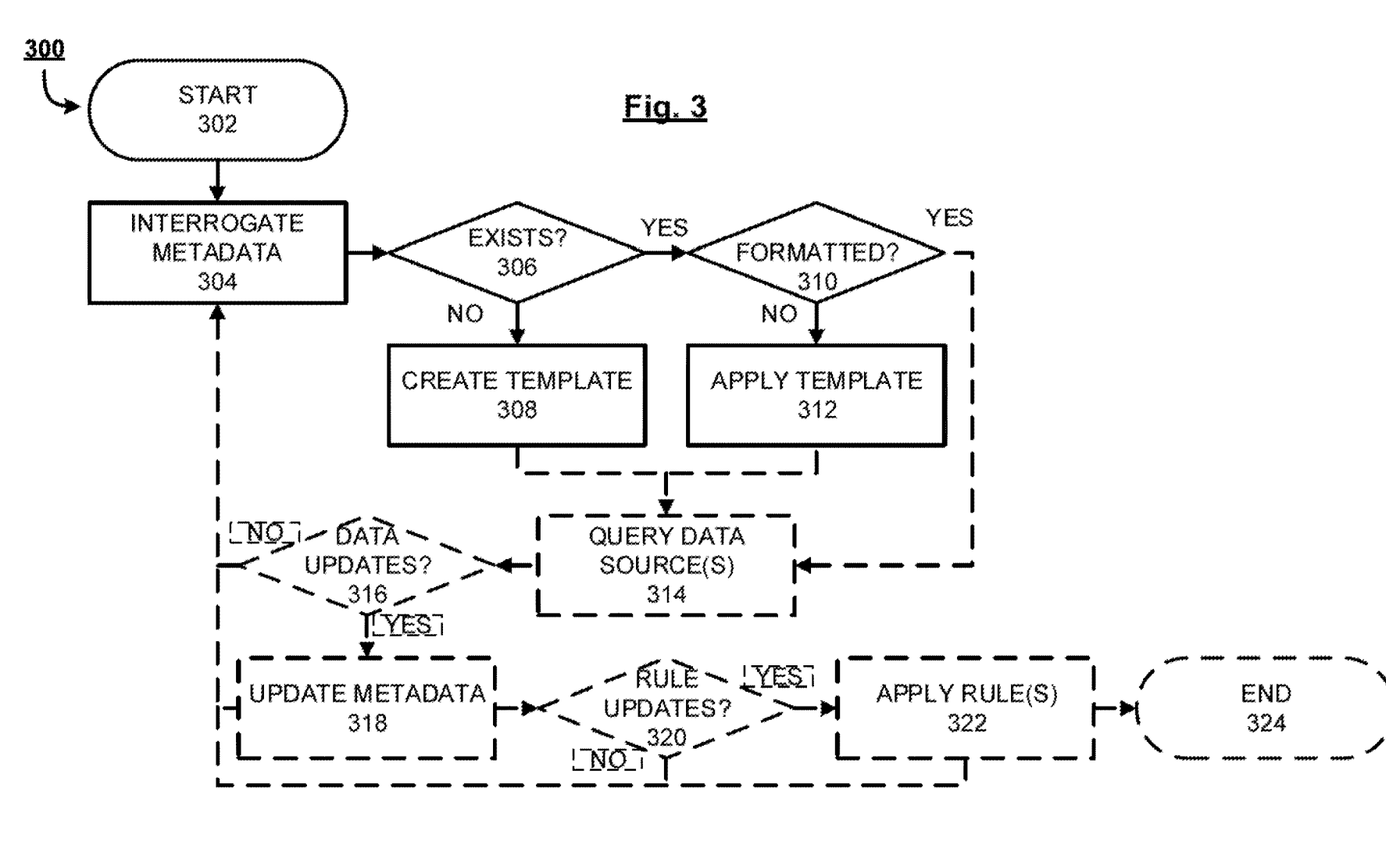
FIG. 3 illustrates a flow chart of an example methodology for maintaining metadata for use in view of varying jurisdictional requirements.

FIG. 3 illustrates a methodology 300 for conditioning data for use with jurisdictional management arrangements. Methodology 300 begins at 302 and proceeds to 304 where a portion of data is interrogated for metadata and metadata (if any) is received. At 306 a determination is made as to whether jurisdictional metadata (e.g., metadata that identifies pertinent jurisdictional rules, metadata including parameters to which pertinent jurisdictional rules can be applied) exists. If no metadata exists, methodology 306 proceeds to 308 where a metadata template is created for the portion of data. A metadata template can include, but is not limited to, one or more formatted fields including data pertinent to jurisdictional rules (e.g., type of data, location of owner or referenced party, location of requester, location where data stored, location where data created, et cetera). In addition to containing data to determine what jurisdictional rules apply, a template may indicate one or more jurisdictional rules (or other rules) known to apply.

If the determination at 306 indicates metadata exists, at 310 the metadata is analyzed to determine whether it is complete and formatted for use to maintain current with jurisdictional rules. If the determination at 310 indicates the metadata is not complete or formatted, methodology 300 can proceed to 312 where a metadata template is applied to the portion of data. This can include, but is not limited to, formatting existing data (e.g., processing or re-formatting for greater applicability, encoding, decoding, tagging, encrypting, summarizing, annotating, abstracting), supplementing existing data, locating additional data (e.g., using prompts, scraping, searching, interpolation, or other techniques), et cetera, to complete a template.

Once methodology 300 has established or confirmed the presence of appropriate metadata templates applied to the portion of data, methodology 300 can take different embodiments or branch in manners utilizing the data templates.

In an embodiment, if the determination at 310 returns positive, or after 312, methodology 300 proceeds to 314 where one or more data sources are queried to collect up-to-date information regarding those data sources. Such information can be used to, e.g., determine whether changes or supplementations exist to any element of the template.

In this regard, in an embodiment, a determination at 316 can assess whether any data is updated. The data could be a change to data populating one or more portions of the template (e.g., a field in the template) or the template itself (e.g., new field added to template, re-formatting of template or data therein, et cetera.). If, based on data received or located at 314 or other data, the determination at 316 returns positive, elements can be updated at 318. In an embodiment, a change to a template can be populated across multiple instances of that template's use. In an embodiment, a change to a template can concern only that specific instance of the template. In embodiments, an update to a field of a template can modify or append the field. In still further embodiments, multiple versions can be preserved and a new version can be created, or a copy of an old version retained.

In addition to data populating or defining a template, queries at 314 or other information can be used to determine whether rule changes exist. Applicable rules may change based on changes to the rules themselves (e.g., statutes, regulations, business or organizational rules), or based on data coming into existence, being located, or being deleted that impacts the rules that apply. In embodiments, a new rule can be defined or created based on a modification to existing rules, conflict or interaction between rules, et cetera. At 320, a determination can be made as to whether an update to rules has occurred. If so, rules can be applied to the data at 322. This can include updating templates, tags, or systems or functions that utilize or apply the rules. At 322, as well as elsewhere in methodology 300 (e.g., 318, 312, et cetera), changes or updates can be logged or tracked to facilitate an audit trail or version history.

In embodiment, rules applied can be a "most restrictive regime," such that when two or more sets of rules may apply, the more secure or cautious rule set can be used. In some embodiments, a hybrid regime can be created that selects the most restrictive rules or sub-rules within two or more sets of rules, such that the most secure or most cautious group of rules can be selected and used from multiple disparate regimes.

Where data (e.g., at 316/318) or rules (e.g., at 320 or 322) change such that a rule would be violated, automated actions can be taken to correct the violation, and/or alerts can be sent.

In embodiments, after applying rules at 322, methodology 300 can end at 324. Alternatively, after various actions or determinations (e.g., at 316, 318, 320, 322, or other points), methodology 300 can recycle to 304 or another aspect of the methodology. In this manner, the methodology can be repeated cyclically and continuously to condition data and ensure rules are properly applied.

Figure 4:
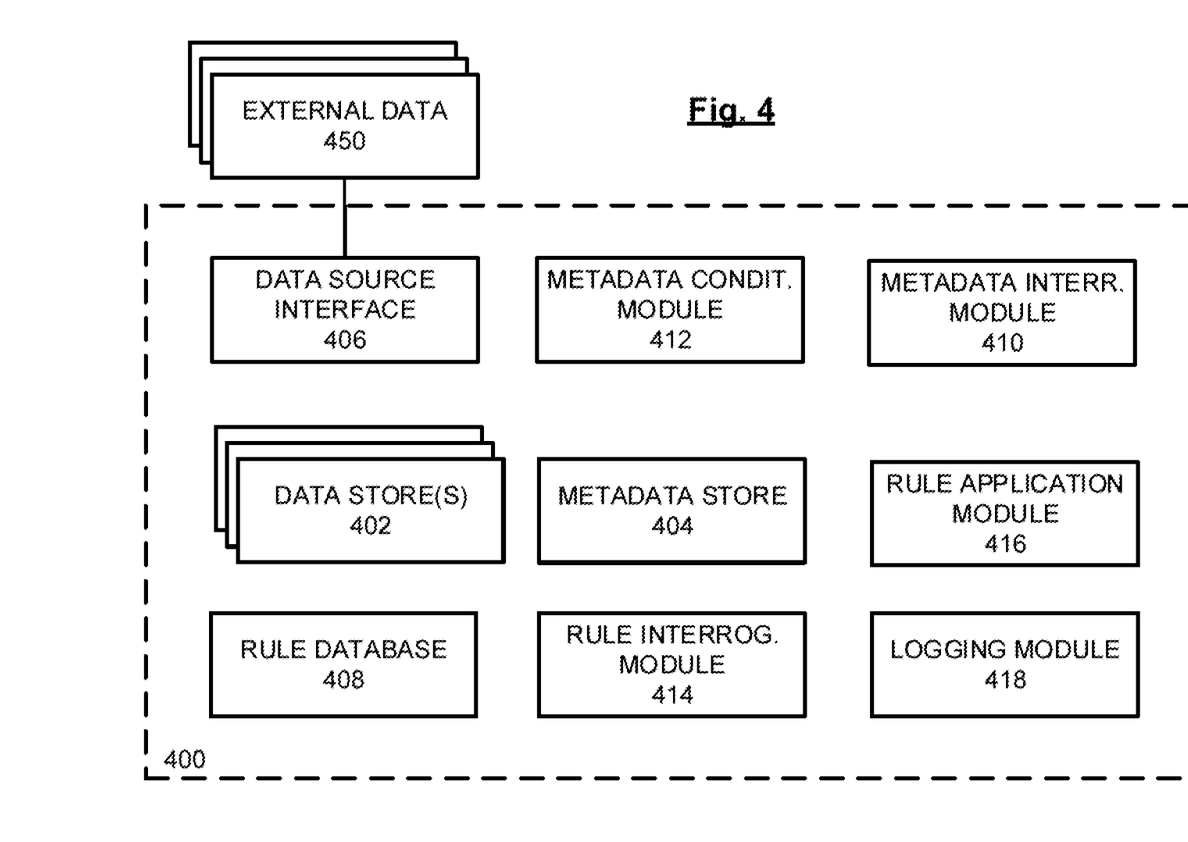
FIG. 4 illustrates a block diagram of an example system for maintaining metadata in view of varying jurisdictional requirements.

Turning to FIG. 4, illustrated is a system 400 for conditioning and managing data for use with jurisdictional rules and rule management. System 400 can include, in embodiments, one or more data store(s) 402, metadata store 404, data source interface 406, rule database 408, metadata interrogation module 410, metadata conditioning module 412, rule interrogation module 414, rule application module 416, and logging module 418.

Data store(s) 402 can comprise one or more data stores that store any type of data. Examples of such data could include personally identifiable information, protected health information, psychiatric or psychological information, proprietary data, personal data, financial data, data identified by a user as personal or private (e.g., opt-in security), et cetera. The data for data store(s) 402 can be collected using data source interface 406, which is operatively coupled with one or more sources of external data 450. In embodiments, data source interface 406 can identify relevant metadata to intake with associated information. Metadata ingested using data source interface 406 may or may not be explicit in the data. For example, personal health information may not have associated metadata regarding where the data is at rest, but data source interface may collect information about the data source (or collection process itself) to populate or supplement relevant metadata.

Metadata store 404 store metadata concerning at least the data in data store(s) 402. The metadata can, in embodiments, exclude the substance or payload of the data in data store(s) 402, or sensitive portions thereof. In alternative embodiments, metadata store 404 may still include some sensitive data. Metadata store 404 stores metadata according to one or more metadata templates to condition, organize, and assemble metadata pertinent to jurisdictional rules. In embodiments, metadata store 404 is populated by scraping, harvesting, or selecting subsets of data from data store(s) 402.

Rule database 408 stores jurisdictional or organizational rules, or representations thereof. In embodiment, the rules stored can be functions, algorithms, code, pseudocode, macros, or parameters for management engines or systems that reflect, in computer implementation, automatic enforcement and handling of the pertinent statutes, regulations, business practices, et cetera. For example, data can be categorized according to a metadata template for rule application. Based on a particular value in one or more metadata template fields, rules can be associated with some or all of the data to which the metadata refers. The rules can enforce, e.g., permissions, access request receipt and routing, access request response routing, reporting requirements, and various other data rule requirements or considerations.

Metadata interrogation module 410 is configured to analyze metadata in metadata store 404 based on the rules in rule database 408 to determine which rules apply to given metadata. In embodiments, one or more rules can be identified as applicable. Moreover, rule regimes (e.g., GDPR, CCPA, organizational rules, et cetera) can be identified as applicable such data. In embodiments, metadata interrogation module 410 can be configured to identify two or more complementary, conflicting, supplemental, or alternative rules. In this manner, all pertinent rules can be identified even if not all can be simultaneously implemented.

Metadata conditioning module 412 can be configured to encode, translate, format, or otherwise modify metadata for standardization and use in a template such that relevant rules can be consistently identified and applied for different portions of data. In embodiments, metadata conditioning module may extract or infer metadata for one or more fields that do not have explicit metadata provided therefor during ingestion of data from external data 450. For example, the location of the data at rest, systems on which it is at rest or through which it travels, offering or requesting party information, et cetera, may be determined by metadata conditioning module if it is not expressly identified as a metadata field associated with the portion of data.

Rule interrogation module 414 is configured to examine the metadata in view of the rules to determine which portions of data one or more rules applies to, based on the metadata in metadata store 404 and the rules in rule database 408. Rule interrogation module 414 can be configured to inspect particular fields, or particular values of fields, to identify that a given rule applies based on the value of metadata (to include its existence or a non-null value).

Rule application module 416 is configured to apply rules identified to rule interrogation module 414. Rule application module 416 can include one or more interfaces configured to interact with other components or systems to specify rules, or in some embodiments provide rules as code, for application. In embodiments rule application module 416 can be configured to update metadata fields in a template that identify applicable rules. In further embodiments, rule application module may apply or specify a most-restrictive group of data rules where two or more sets of rules apply. This can include selecting one or more rules for application from two or more regimes. For example, if a company policy is less restrictive than applicable state law as to a first category of data, but more restrictive than applicable state law as to a second category of data, rules reflecting state law can be selected and applied for the first category of data and rules reflecting the company policy can be selected and applied for the second category of data.

Logging module 418 can be configured to log a variety of events associated with data and metadata. Logging module 418 can log updates or changes to any of the databases of system 400 or data therein. Logging module can also be configured to log (and store in, e.g., data store(s) 402) various information pertaining to use or access of the data as ascertainable via data source interfaces 406.

Figure 5:
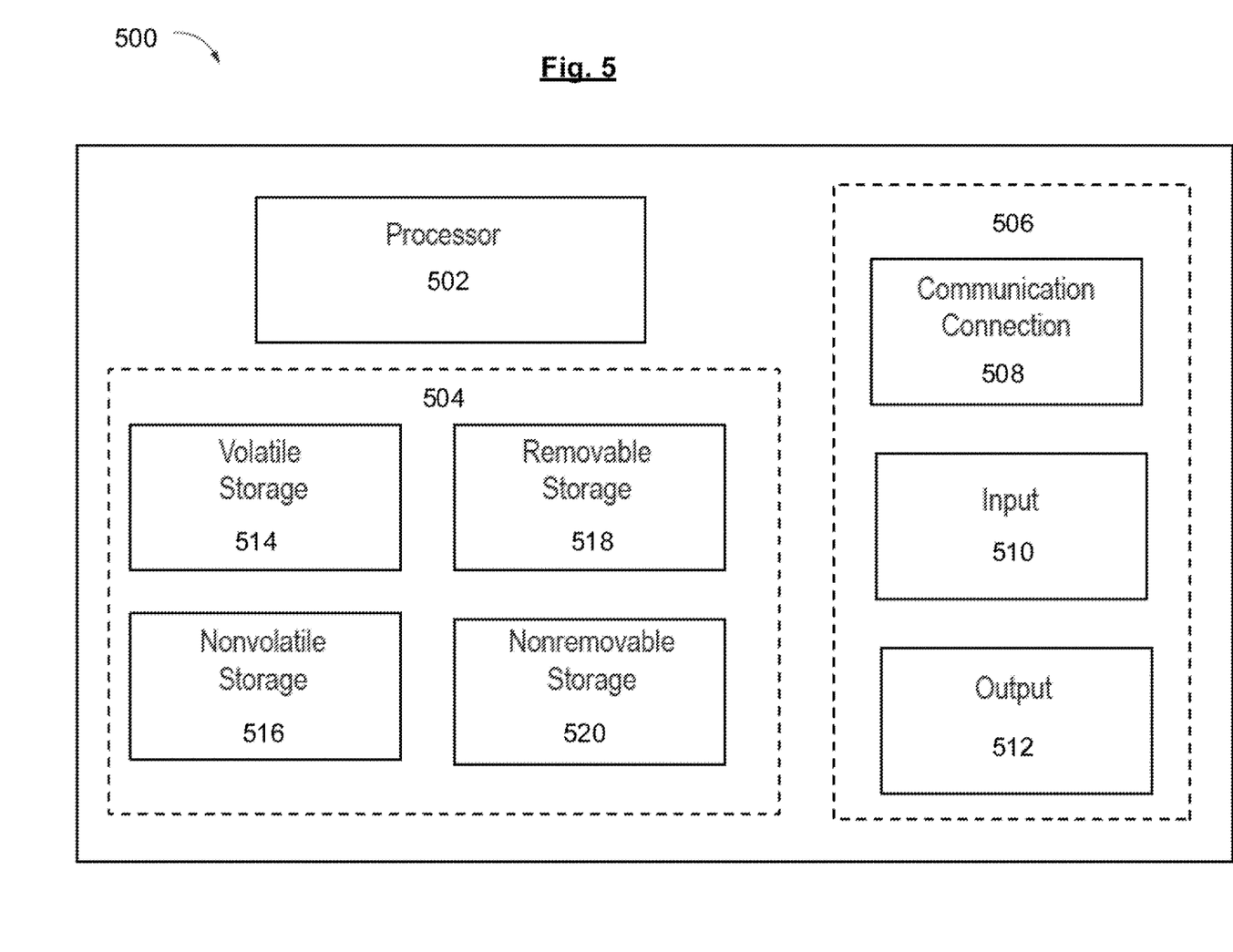
FIG. 5 is a block diagram illustrating an example implementation of a device which can be utilized in conjunction with or comprise a portion of systems disclosed or implement or execute methods herein.

Aspects disclosed herein can be implemented using computer devices and networks. FIG. 5 illustrates a device 500. Device 500 may comprise all or a part of modules or components herein. Device 500 may comprise hardware or a combination of hardware and software. The functionality to facilitate telecommunications via a telecommunications network may reside in one or combinations of links, portals, or connections. Device 500 depicted in FIG. 5 may represent or perform functionality of an appropriate device 500, or combination of modules or components herein. It is emphasized that the block diagram depicted in FIG. 5 is an example and not intended to imply a limitation to a specific implementation or configuration. Thus, device 500 may be implemented in a single device or multiple devices. Multiple network entities may be distributed or centrally located. Multiple network entities may communicate wirelessly, via hard wire, or any appropriate combination thereof.

Device 500 may comprise a processor 502 and a memory 504 coupled to processor 502. Memory 504 may contain executable instructions that, when executed by processor 502, cause processor 502 to effectuate operations associated with aspects disclosed herein. As evident from the description herein, device 500 is not to be construed as software per se.

In addition to processor 502 and memory 504, device 500 may include an input/output system 506. Processor 502, memory 504, and input/output system 506 may be coupled together (coupling not shown in FIG. 5) to allow communications there between. Each portion of device 500 may comprise circuitry for performing functions associated with each respective portion. Thus, each portion may comprise hardware, or a combination of hardware and software. Accordingly, each portion of device 500 is not to be construed as software per se. Input/output system 506 may be capable of receiving or providing information from or to a communications device or other network entities configured for telecommunications. For example input/output system 506 may include a wireless communications (e.g., WiFi/2.5G/3G/4G/5G/GPS) card. Input/output system 506 may be capable of receiving or sending video information, audio information, control information, image information, data, or any combination thereof. Input/output system 506 may be capable of transferring information with device 500. In various configurations, input/output system 506 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 506 may comprise a WiFi finder, a two-way GPS chipset or equivalent, or the like, or a combination thereof.

Input/output system 506 of device 500 also may contain communication connection 508 that allows device 500 to communicate with other devices, network entities, or the like. Communication connection 508 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 506 also may include an input device 510 such as keyboard, mouse, pen, voice input device, or touch input device. Input/output system 506 may also include an output device 512, such as a display, speakers, or a printer.

Processor 502 may be capable of performing functions associated with aspects described herein. For example, processor 502 may be capable of, in conjunction with any other portion of device 500, managing social media communications as described herein.

Memory 504 of device 500 may comprise a storage medium having a concrete, tangible, physical structure. As is known, a signal does not have a concrete, tangible, physical structure. Memory 504, as well as any computer-readable storage medium described herein, is not to be construed as a signal. Memory 504, as well as any computer-readable storage medium described herein, is not to be construed as a transient signal. Memory 504, as well as any computer-readable storage medium described herein, is not to be construed as a propagating signal. Memory 504, as well as any computer-readable storage medium described herein, is to be construed as an article of manufacture.

Memory 504 may store any information utilized in conjunction with telecommunications. Depending upon the exact configuration or type of processor, memory 504 may include a volatile storage 514 (such as some types of RAM), a nonvolatile storage 516 (such as ROM, flash memory), or a combination thereof. Memory 504 may include additional storage (e.g., a removable storage 518 or a nonremovable storage 520) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 500. Memory 504 may comprise executable instructions that, when executed by processor 502, cause processor 502 to effectuate operations for, e.g., instantiating processes or nodes, interrogating metadata, updating metadata, et cetera.

Figure 6:
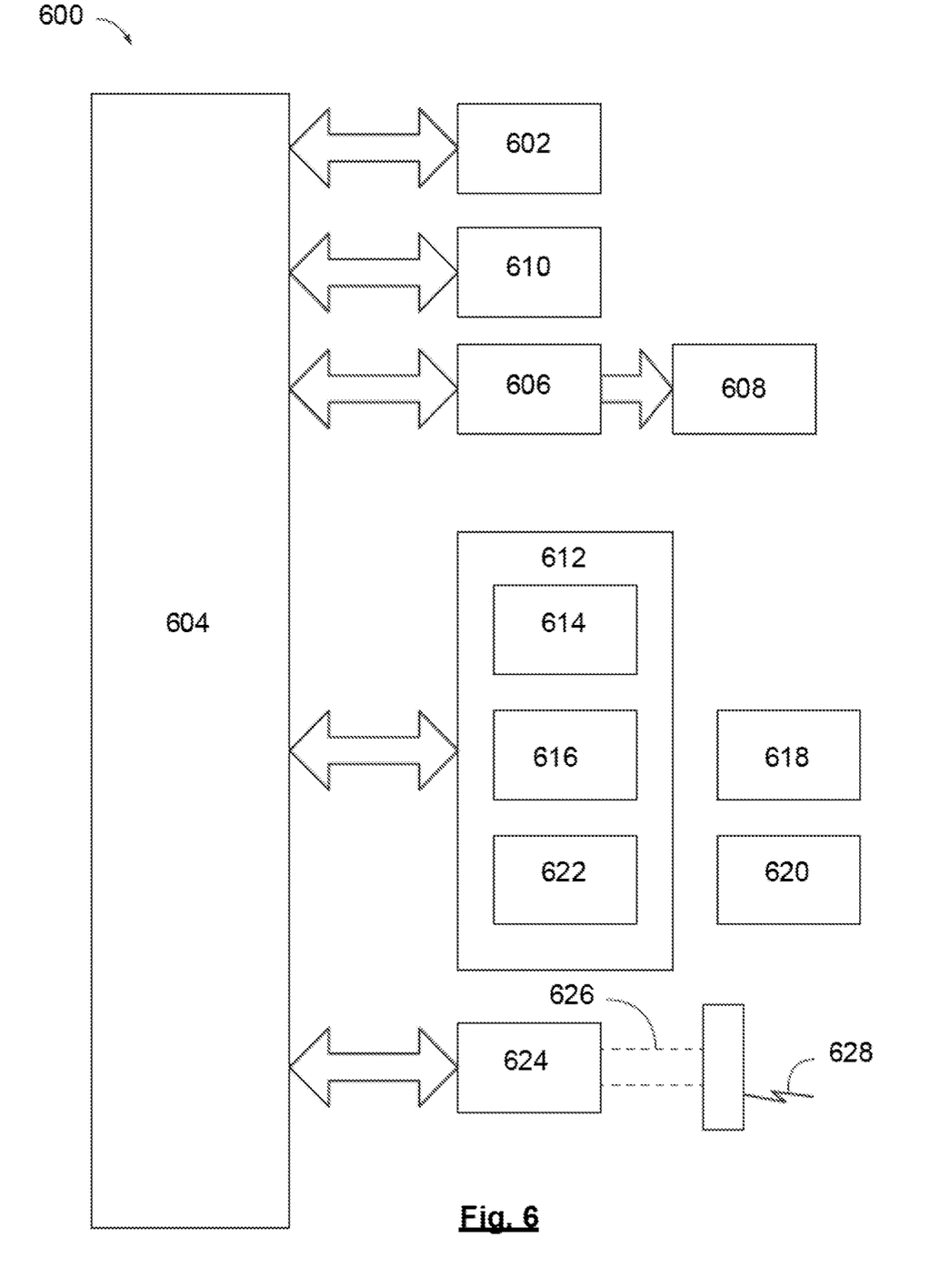
FIG. 6 is a block diagram of a computer system that be used to implement at least a portion of aspects herein.

FIG. 6 illustrates a computer-based system 600 that may constitute, include parts of, or be used to realize one or more of aspects of, e.g., systems 200 or 400, device 500, or methodologies and techniques described herein. Computer-based system 600 includes at least one processor, such as a processor 602. Processor 602 may be connected to a communication infrastructure 604, for example, a communications bus, a cross-over bar, a network, or the like. Various software aspects are described in terms of this example computer-based system 600. Upon perusal of the present description, it will become apparent to a person skilled in the relevant art(s) how to implement the present disclosure using other computer systems or architectures.

Computer-based system 600 includes a display interface 606 that forwards graphics, text, or other data from communication infrastructure 604 or from a frame buffer (not shown) for display on a display unit 608.

Computer-based system 600 further includes a main memory 610, such as random access memory (RAM), and may also include a secondary memory 612. Secondary memory 612 may further include, for example, a hard disk drive 614 or a removable storage drive 616, representing a floppy disk drive, a magnetic tape drive, an optical disk drive, etc. Removable storage drive 616 reads from or writes to a removable storage unit 618 in a well-known manner. Removable storage unit 618 may represent a floppy disk, magnetic tape, or an optical disk, and may be read by and written to by removable storage drive 616. As will be appreciated, removable storage unit 618 includes a computer usable storage medium having computer software or data stored therein.

In accordance with various aspects of the present disclosure, secondary memory 612 may include other similar devices for allowing computer programs or other instructions to be loaded into computer-based system 600. Such devices may include, for example, a removable storage unit 620 and an interface 622. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 620 to computer-based system 600.

Computer-based system 600 may further include communication interface 624. Communication interface 624 may allow software or data to be transferred between computer-based system 600 and external devices. Examples of communication interface 624 include, but may not be limited to a modem, a network interface (such as an Ethernet card), a communications port, a Personal Computer Memory Card International Association (PCMCIA) slot and card, or the like. Software or data transferred via communication interface 624 may be in the form of a number of signals, hereinafter referred to as signals 626, which may be electronic, electromagnetic, optical or other signals capable of being received by communication interface 624. Signals 626 may be provided to communication interface 624 via a communication path (e.g., channel) 628. Communication path 628 carries signals 626 and may be implemented using wire or cable, fiber optics, a telephone line, a cellular link, a radio frequency (RF) link, or other communication channels.

In this document, the terms "computer program medium" and "computer usable medium" are used to generally refer to media such as removable storage drive 616, a hard disk installed in hard disk drive 614, or the like. These computer program products provide software to computer-based system 600. The present disclosure is directed to such computer program products.

Computer programs (also referred to as computer control logic) may be stored in main memory 610 or secondary memory 612. The computer programs may also be received via communication interface 604. Such computer programs, when executed, enable computer-based system 600 to perform the functions consistent with the present disclosure, as discussed herein. In particular, the computer programs, when executed, enable processor 602 to perform the features of the present disclosure. Accordingly, such computer programs represent controllers of computer-based system 600.

In accordance with an aspect of the present disclosure, where the disclosure is implemented using a software, the software may be stored in a computer program product and loaded into computer-based system 600 using removable storage drive 616, hard disk drive 614, or communication interface 624. The control logic (software), when executed by processor 602, causes processor 602 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special purpose computer, or other programmable data-processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications in systems and networks discussed herein.

Methodologies herein are described with specific aspects for ease of explanation with respect to various embodiments. However, methodologies embraced under the scope and spirit of the disclosure may vary, to include excluding particular aspects or comparisons described.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed is:

1. A method, comprising:
   receiving a request from a client to utilize a portion of data with a service;
   accessing a set of jurisdictional rules;
   determining that a jurisdictional restriction among the set of jurisdictional rules applies to utilization of the portion of data, wherein the jurisdictional restriction is associated with a jurisdiction;
   analyzing routing to provide the portion of data to the service;
   determining that the service to utilize the portion of data is unavailable in the jurisdiction;
   determining a routing to provide the portion of the data to the service based on instantiating an instance of the service within the jurisdiction;
   deploying an instance of the service on hardware in the jurisdiction;
   utilizing the portion of data in the jurisdiction via the instance of the service on the hardware in the jurisdiction complying with the jurisdictional restriction; and
   completing a transaction using an output generated from the portion of the data.

2. The method of claim 1,
   wherein the request includes requester information, and wherein the portion of data includes at least one of subject information and requested data information.

3. The method of claim 2, comprising:
   determining a location of the client, wherein the service to utilize the portion of data is unavailable because of the location of the client.

4. The method of claim 2, comprising:
   comparing at least one of the requester information, the subject information, and the requested data information to the set of jurisdictional rules; and
   determining that the at least one of the requester information, the subject information, and the requested data information violates at least one of the set of jurisdictional rules,
   wherein the service to utilize the portion of data is unavailable because of the violation.

5. The method of claim 1, wherein the service to utilize the portion of data is unavailable because of a location of at least one of hardware hosting the service, hardware hosting the portion of data at rest, or hardware utilized by a requester of the portion of data.

6. The method of claim 1, comprising:
creating an output from utilizing the portion of data in the jurisdiction via the instance of the service.

7. The method of claim 6, comprising:
interrogating the output against a set of jurisdictional rules.

8. The method of claim 7, comprising:
providing the output to the requester in response to determining that the output does not violate any of the set of jurisdictional rules.

9. The method of claim 1, wherein the jurisdictional restriction is a data control established by laws of a state, and wherein the jurisdiction is at least a portion of the state.

10. A non-transitory computer-readable medium storing instructions that when executed by a processor effectuate:
a compliance manager component configured to:
access a set of jurisdictional rules;
determine that a jurisdictional restriction among the set of jurisdictional rules applies to utilization of a portion of data, wherein the jurisdictional restriction is associated with a jurisdiction;
analyzing routing to provide the portion of data to a service, wherein the service is to utilize the portion of the data;
determine that a compliant service to utilize the portion of data is unavailable;
determining a routing to provide the portion of the data to the service based on instantiating an instance of the service within the jurisdiction;
deploy an instance of the compliant service; and
utilize the portion of data using the instance of the compliant service, wherein the compliant services complies with the jurisdictional restriction.

11. The non-transitory computer-readable medium of claim 10, wherein the compliance manager is configured to:
receive a request from a client to utilize the portion of data, wherein the request includes requester information, and wherein the portion of data includes at least one of subject information and requested data information.

12. The non-transitory computer-readable medium of claim 11, wherein the compliance manager is configured to:
determine a location of the client, wherein the service to utilize the portion of data is unavailable because of the location of the client.

13. The non-transitory computer-readable medium of claim 11, wherein the compliance manager is configured to:
compare at least one of the requester information, the subject information, and the requested data information to the set of jurisdictional rules; and
determine that the at least one of the requester information, the subject information, and the requested data information violates at least one of the set of jurisdictional rules,
wherein the service to utilize the portion of data is unavailable because of the violation.

14. The non-transitory computer-readable medium of claim 10, wherein the service to utilize the portion of data is unavailable because of a location of at least one of hardware hosting the service, hardware hosting the portion of data at rest, or hardware utilized by a requester of the portion of data.

15. The non-transitory computer-readable medium of claim 10, wherein the compliant service is configured to create an output from utilizing the portion of data in the jurisdiction via the instance of the service.

16. The non-transitory computer-readable medium of claim 15, wherein the compliance manager is configured to:
interrogate the output against a set of jurisdictional rules.

17. The non-transitory computer-readable medium of claim 16, wherein the compliance manager is configured to facilitate provisioning of the output to a requester of the service in response to the compliance manager determining that the output does not violate any of the set of jurisdictional rules.

18. The non-transitory computer-readable medium of claim 10, wherein the jurisdictional restriction is a data control established by laws of a state, and wherein the jurisdiction is at least a portion of the state.

* * * * *

UNITED STATES PATENT AND TRADEMARK OFFICE
CERTIFICATE OF CORRECTION

| | |
|---|---|
| PATENT NO. | : 11,748,496 B1 |
| APPLICATION NO. | : 16/942216 |
| DATED | : September 5, 2023 |
| INVENTOR(S) | : Ashley Philbrick et al. |

It is certified that error appears in the above-identified patent and that said Letters Patent is hereby corrected as shown below:

In the Specification

First paragraph under CROSS-REFERENCE TO RELATED APPLICATIONS, the Application Number:
Delete: "62/880,5470" replace with: 62/880,570

Signed and Sealed this
Twenty-eighth Day of November, 2023

Katherine Kelly Vidal
*Director of the United States Patent and Trademark Office*